United States Patent [19]

Thore

[11] Patent Number: 5,511,949
[45] Date of Patent: Apr. 30, 1996

[54] METHOD FOR PRODUCING A MONOBLOC ROTOR WITH HOLLOW BLADES AND MONOBLOC ROTOR WITH HOLLOW BLADES OBTAINED BY SAID METHOD

[75] Inventor: Monique A. Thore, Crosne, France

[73] Assignee: Societe Nationale D'Etude Et De Construction De Moteurs D'Aviation "Snecma", Paris, France

[21] Appl. No.: 517,194

[22] Filed: Aug. 21, 1995

Related U.S. Application Data

[63] Continuation of Ser. No. 174,399, Dec. 28, 1993, abandoned.

[30] Foreign Application Priority Data

Jan. 6, 1993 [FR] France .................................. 93.00043

[51] Int. Cl.⁶ ..................................................... F04D 29/34
[52] U.S. Cl. .................... 416/213 R; 416/204 A
[58] Field of Search ............................. 416/204 A, 213 R

[56] References Cited

U.S. PATENT DOCUMENTS

| | | | |
|---|---|---|---|
| 2,347,034 | 4/1944 | Doran | 416/213 |
| 3,588,276 | 6/1971 | Judd | 416/213 |
| 3,768,147 | 10/1973 | Berry et al. | 416/213 |
| 4,034,182 | 7/1977 | Schlosser et al. | |
| 4,784,572 | 11/1988 | Novotny et al. | 416/213 |
| 4,784,573 | 11/1988 | Ress, Jr. | 416/213 |

FOREIGN PATENT DOCUMENTS

| | | | |
|---|---|---|---|
| 0458630 | 11/1991 | European Pat. Off. | |
| 405301 | 8/1943 | France | 416/213 |
| 2602266 | 2/1988 | France | |
| 2619331 | 2/1989 | France | |
| 885851 | 6/1953 | Germany | 416/213 |
| 123702 | 1/1949 | Sweden | 416/213 |

OTHER PUBLICATIONS

Patent Abstracts of Japan, vol. 9, No. 275 (N-426)(1998), Nov. 2, 1985, JP-A-60 118394, Jun. 25, 1985.

*Primary Examiner*—John T. Kwon
*Attorney, Agent, or Firm*—Oblon, Spivak, McClelland, Maier & Neustadt

[57] ABSTRACT

The present invention relates to a monobloc rotor having a disk and hollow blades which are secured to the disk. The disk includes a protuberance and a projection on a periphery of the disk such that the projection forms a block having a shape which approximately corresponds to a shape of an inside of a radially internal extremity of the blade. The present invention further relates to a monobloc rotor in which a block is welded to the protuberance with the block forming a projection having a shape which approximately corresponds to a shape of an inside of a radially internal extremity of the blade.

4 Claims, 1 Drawing Sheet

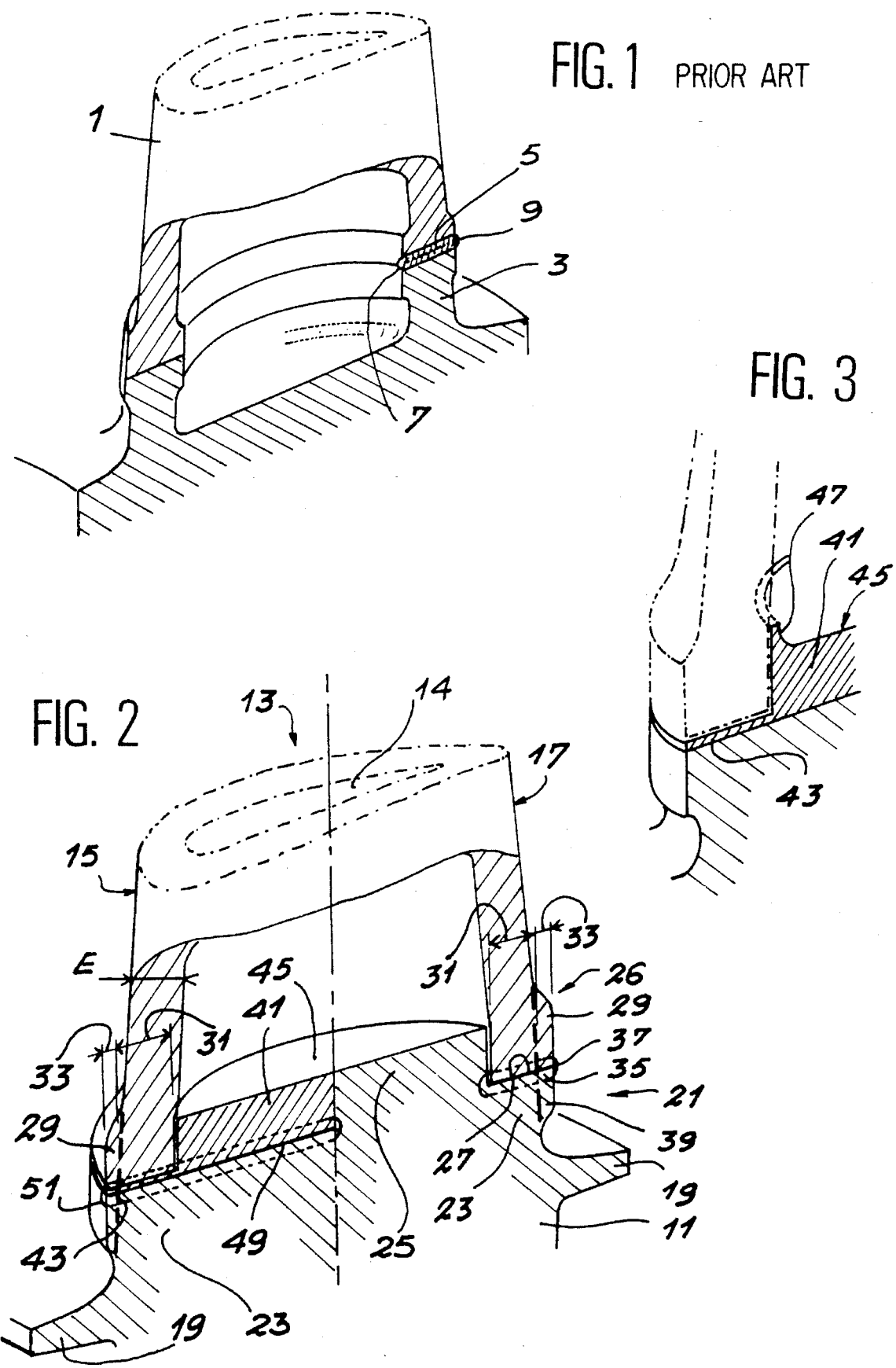

METHOD FOR PRODUCING A MONOBLOC ROTOR WITH HOLLOW BLADES AND MONOBLOC ROTOR WITH HOLLOW BLADES OBTAINED BY SAID METHOD

This application is a continuation of application Ser. No. 08/174,399, filed on Dec. 28, 1993, now abandoned

FIELD OF THE INVENTION

The present invention concerns a method for producing a monobloc rotor with hollow blades, as well as said monobloc rotor with hollow blades obtained by said method and particular a low pressure compressor rotor.

BACKGROUND OF THE INVENTION

As part of new studies concerning the low pressure compressors of a turbojet engine, most research work has been directed towards lightening the weight of the rotors of these compressors so as to obtain a gain of weight. These rotors are mainly of the monobloc type and are known in English terminology under the name of "BLISK", namely a contraction of the term "bladed disk". These rotors are monobloc, that is the blades form an integral part of the hub or are linked to the latter, as opposed to "winged disk" type rotors whose blades are provided with feet engaged in machined alveoles at the periphery of the hub before being locked in said alveoles.

So as to lighten these "blisk" type rotors, two technological solutions have been examined. One first solution consists of machining the turbine blade in the block, that is when the blades are embodied in situ at the periphery of the disk by machining the blade profiles. These profiles thus form an integral part of the hub. They are then recessed, also by machining. However, this technological solution is difficult to implement owing to the small thickness of the blades and complex twisted shape. This solution is far too costly to be produced on an industrial scale.

A second solution consists of preparing the blades previously recessed by machining and twisted and which are next solely linked to the hub or boss by various techniques, such as welding or soldering. This solution, much easier to implement and less expensive industrially, has been retained.

Various techniques for securing blades to a hub are already known.

According to the patent application FR-A-2 602 26, there exists a method for producing a set of rotors for a gas turbo-engine. This method firstly consists of producing a disk fitted with two external annular flanges, and secondly a ring of blades, also provided with two annular flanges, and then of hot-assembling the ring of blades on the disk. Then the flanges are sealed under vacuum and the entire unit is subjected to hot isostatic compression.

This method can only be applied to full blades or at least blades including a full base and two lateral flanges since it consists of crushing the two faces opposite the flanges of the blade and those of the disk so as to form a continuous link. This method is unable to correctly fix the hollow blades whose cavity opens at the base of said blade.

According to the patent EP-A-0 458 630, there is also a method to secure individual blades to the disk of a "BLISK" type rotor. This method is applicable to full blades which are retained between the two jaws of a fixing device and linked on the disk by a linking operation by means of friction. This method is also applicable to the repair of blades.

According to the pat. U.S. No. 4 034 182, there is also a method consisting of assembling via their lateral sides a series of slightly concave segments bearing on their outer surface a compressor blade so as to form a ring fitted with radial blades once these elements have been assembled. However, this method is difficult to apply for the embodiment of "BLISK" type rotors with hollow blades.

Finally, according to the patent application FR-A-2 619 331, there exists a method for producing a rotor with full blades, especially for a gas turbine engine. This method concerns the securing of the full blades to the disk of a rotor. It includes stages consisting of firstly forming a cavity in a portion constituting the foot of a blade, and secondly a plurality of cubic projections on the periphery of the disk of the rotor. Then each blade is assembled by being nested on the disk. The actual fixing is effected by means of pressure and heating. This link is mainly effected between the upper face of the cubic projection and the bottom of the cavity provided in the blade. Subsequently, it is possible to carry out a machining so as to remove the portions of the blade which define the lateral portions of this cavity. This type of method cannot be applied to the entire height of hollow blades since the extremity surface of the cubic projection is then unable to abut against the bottom of the cavity of the blade.

Finally, as shown on the attached FIG. 1, when it is desired to weld a hollow blade 1 to a rotor disk 3, the weld seam 5 exhibits a weld projection 7 inside the hollow blade and a projection 9 outside the latter. Now, it is impossible to mechanically machine the internal projection 7 owing to the extreme thinness of the blade 1 and its twisted geometry. As a result, the state of the internal surface of the blade is not compatible with non-destructive inspection tests (radiography, ultrasounds, etc) absolutely essential for observing aeronautic requirements.

SUMMARY OF THE INVENTION

The aim of the present invention is to resolve these drawbacks.

To this effect, the invention concerns a method for producing a monobloc rotor with hollow blades.

According to the characteristics of the invention, this method includes the following stages:

providing on the periphery of the disk of the rotor and at the right of each blade means forming a projection whose shape corresponds approximately to the shape of the inside of the radially internal extremity of the hollow blades, these projection means being encompassed by an approximately annular flat joining surface, nesting the radially internal extremity of each hollow blade on said projection means, securing each blade to the disk of the rotor by welding means so that the approximately annular surface defined by the thickness of the walls of the hollow blade is welded to said flat joining surface of the disk.

By virtue of the presence of the projection means, the weld seam is unable to open inside the blade and thus form an internal projection. In addition, it is impossible to suppress the extremities of the weld since the internal projection does not exist.

Moreover, this method consisting of adding the blades to the extremity of the disk makes it possible to reduce production costs since the machining of the disk and blades is effected separately.

Finally, this method is also applicable to the repair of a damaged blade which may then be simply replaced by a new blade.

The invention also concerns a monobloc rotor with hollow blades of the type including a disk, several hollow blades being fixed at the periphery of said disk, wherein the disk exhibits on its periphery and at the right of each blade a protuberance and a projection cast with the disk, the projection having dimensions smaller than those of the protuberance so as to define with respect to the latter a shoulder forming a flat joining surface on which the surface defined by the thickness of the blade is welded.

According to a second embodiment, the disk has on its periphery and at the right of each blade a protuberance, a block forming a projection whose shape approximately corresponds to the shape of the inside of the radially internal extremity being welded to the protuberance, said block being encompassed by a thin collar, the surface defined by the thickness of the blade being welded on said thin collar.

BRIEF DESCRIPTION OF THE DRAWINGS

The invention shall more readily be understood from a reading of the following description of one embodiment of the invention with reference to the accompanying drawings in which:

FIG. 1 is a diagrammatic cutaway view of a method of the prior art for securing blades to a rotor disk, FIG. 2 is a diagrammatic cutaway view illustrating two different embodiments of the production method of the invention, and FIG. 3 is a detailed view of one portion of FIG. 2.

DETAILED DESCRIPTION OF THE PREFERRED EMBODIMENTS

As shown on FIG. 2, the rotor of the invention is a monobloc rotor of the type with hollow blades ("BLISK"). This rotor includes a disk 11 seen as a partial section on FIG. 2, and a plurality of hollow blades 13 distributed uniformly at the periphery of said disk, only one blade being shown on the figure solely on one portion of its height. By way of illustration, a disk may include 36 blades distributed uniformly on its periphery.

The hollow blade 13 has a slightly twisted conventional shape, its central cavity being given the reference 14, its leading edge 15 and its trailing edge 17.

One first embodiment of the invention is now to be described with reference to the right half of FIG. 2.

The disk 11 is provided on its two lateral faces and at the periphery of the latter with a continuous blade 19. At the time the disk 11 is produced, means forming a projection, generally denoted by the reference 21, are provided on the periphery of said disk and at the right of each blade 13. These projection means 21 are composed of a protuberance 23 and an actual projection 25. This protuberance 23 and this projection 25 are cast on the disk. The projection 25 is a block whose shape corresponds approximately to that of the inside of the cavity 14 of the blade at the level of its radially internal extremity 26, that is the foot of the blade. This projection 25 thus has a slightly concave tapered shape. The dimensions of the projection 25 are slightly smaller than those of the protuberance 23 so as to define a shoulder with respect to said protuberance. This shoulder defines an approximately flat joining surface 27. The meaning of the term "annular" is here to be interpreted as having the shape of a ring (continuous shape around the projection 25). Having regard to the relatively thin and tapered shape of this projection in the type of rotor shown here, the joining surface 27 has more the shape of a flattened ring.

Advantageously, the radially internal extremity 26 of the hollow blade 13 is externally surrounded by an annular flange 29. The intended purpose of this annular flange 29 is to reinforce the thickness of the base of the hollow blade which is secured to the disk. However, its full rôle shall be explained subsequently.

At the time it is produced, each blade 13 is nested on a projection 25 of the disk 11 until the surface 31 defined by the thickness of the walls of the blade and the surface 33 defined by the thickness of the flange 29 are in contact with the flat joining surface 27 of the disk.

Each blade 13 is then secured to the disk 11 by welding means. The term "weld" also includes soldering. These welding means may be welding by a beam of electrons, diffusion welding, soldering, diffusion soldering, spark machining and by means of a laser.

As the walls of the hollow blade 13 are relatively thin (thickness E close to 10 mm), the welding bead 35 extends between the surfaces 31, 33 and 27, but the presence of the projection 25 prevents a weld projection forming inside the blade 13. Thus, it is not necessary to carry out any machining of this weld projection. On the other hand, the external projection 37 of the weld bead is then machined. More specifically, the flange 29 and the corresponding portion 39 of the protuberance 23 are also machined. Thus, a perfect surface continuity is obtained between the disk 11 and the blade 13, this machined sur#ace being shown by the dotted line.

In a simplified version where the blade 13 does not include a flange 29, only the external projection 37 is machined.

A second embodiment of the production method of the invention is shown at the left portion of FIG. 2. According to this production method, the projection means 21 are composed of a protuberance 23, but the projection 25 of the first embodiment is replaced by a block 41 independent of the disk 11. The shape of this block 41 approximately corresponds to that of the inside of the cavity 14 of the blade at the level of its radially internal extremity 26 so as to to be able to penetrate inside the latter. This block 41 is surrounded by an extremely thin flat small collar 43 forming a flat annular joining surface similar to the joining surface 27. This appears more clearly in detail on FIG. 3. This collar 43 is provided at the level of the radially internal portion of the block 41.

In addition, the block may preferably have on its face 45 opposite the cavity 14 a peripheral protruding portion 47 extending radially outwardly and over the entire periphery of this surface 45.

At the time the disk 11 is produced, only the protuberance 23 is provided on the periphery of said disk. Then the projection means 21 are placed (that is, the block 41 fitted with the flange 43), and then each blade 13 is nested on these means 21. Finally, the blade 14, the disk 11 and the projection means 21 are welded, for example by one of the previously mentioned welding methods.

As the blade 14 is relatively thin (thickness E close to 10 mm), the weld or soldering bead traverses the internal walls of the blade and reaches the block 41. Also, welding (fixing) is firstly carried out between the surfaces 31 and 33 corresponding to the thickness of the walls of the blade 13 and the flange 29 and between the flange 43, and secondly between the flange 43 and the disk 11 (protuberance 23). Welding is effected also between the block 41 and the protuberance 23. This weld bead is given the reference 49 (see FIG. 2).

The presence of the block 41 and in particular the protruding portion 47 ensures that the weld bead does not penetrate inside the cavity 14 and that no internal weld projection forms.

The external weld projection 51 is machined in the same way as for the projection 37.

What is claimed is:

1. A monobloc rotor comprising:
    a disk and hollow blades secured to said disk;
    wherein:
        the disk comprises a protuberance and a projection on a periphery of the disk and at the right of each blade;
        the projection forms a block having a shape which approximately corresponds to a shape of an inside of a radially internal extremity of the blade;
        the projection has smaller dimensions than dimensions of the protuberance so as to define with respect to said protuberance a shoulder which forms a flat joining surface around the projection which is substantially parallel to a top surface of the projection; and
        the blade is nested on the projection with a welding bead extending between a surface defined by a thickness of the blade and the flat joining surface, the thickness of the blade being substantially equal to length of the flat joining surface, the projection preventing the welding bead from protecting toward an interior of the hollow blade.

2. A monobloc rotor according to claim 1, wherein the welding bead is formed by a method of the group consisting of a beam of electrons, diffusion welding, soldering diffusion, spark machining and laser welding.

3. a monobloc rotor comprising;
    a disk and hollow blades secured to said disk;
    wherein:
        the disk comprises a protuberance on a periphery of the disk and at the right of each blade;
        a block welded to the protuberance, said block forming a projection having a shape which approximately corresponds to a shape of an inside of a radially internal extremity of the blade;
        a radially internal portion of the block is surrounded by a thin collar forming a flat joining surface which is substantially parallel to a top surface of the projection; and
        the blade is nested on the projection with a welding head extended between a surface defined by a thickness of the blade and said flat joining surface, the thickness of the blade being substantially equal to a length of the flat joining surface, the projection preventing the welding bead from projecting toward an interior of the hollow blade.

4. A monobloc rotor according to claim 3, wherein the welding bead is formed by a method of the group consisting of a beam of electrons, diffusion welding, soldering diffusion, spark machining and laser welding.

* * * * *